United States Patent
Semple et al.

(10) Patent No.: US 9,631,725 B2
(45) Date of Patent: Apr. 25, 2017

(54) ESP MECHANICAL SEAL LUBRICATION

(71) Applicant: Baker Hughes Incorporated, Houston, TX (US)

(72) Inventors: Ryan P. Semple, Owasso, OK (US); David Tanner, Broken Arrow, OK (US); Arturo Luis Poretti, Claremore, OK (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/707,324

(22) Filed: May 8, 2015

(65) Prior Publication Data

US 2015/0323079 A1     Nov. 12, 2015

Related U.S. Application Data

(60) Provisional application No. 62/003,660, filed on May 28, 2014, provisional application No. 61/990,292, filed on May 8, 2014.

(51) Int. Cl.
| | |
|---|---|
| E21B 33/14 | (2006.01) |
| F16J 15/00 | (2006.01) |
| F16J 15/34 | (2006.01) |
| F16J 15/40 | (2006.01) |
| F16J 15/36 | (2006.01) |

(52) U.S. Cl.
CPC ............. *F16J 15/00* (2013.01); *F16J 15/002* (2013.01); *F16J 15/34* (2013.01); *F16J 15/3404* (2013.01); *F16J 15/36* (2013.01); *F16J 15/40* (2013.01)

(58) Field of Classification Search
CPC .. F16J 15/00; F16J 15/002; F16J 15/34; F16J 15/3404; F16J 15/36; F16J 15/40; E21B 33/00–33/12955
See application file for complete search history.

(56) References Cited

U.S. PATENT DOCUMENTS

| | | | |
|---|---|---|---|
| 3,593,795 A * | 7/1971 | Broussard, Sr. ........ | E21B 33/14 166/285 |
| 4,462,765 A | 7/1984 | Rodkin et al. | |
| 5,474,303 A * | 12/1995 | Coles ..................... | F16K 41/10 251/335.2 |
| 6,167,965 B1 | 1/2001 | Bearden et al. | |
| 6,422,822 B1 | 7/2002 | Holmes | |
| 7,104,331 B2 | 9/2006 | Bussear et al. | |
| 7,624,800 B2 | 12/2009 | Jamieson et al. | |
| 7,665,975 B2 | 2/2010 | Parmeter et al. | |
| 7,828,058 B2 | 11/2010 | Fielder | |
| 8,322,444 B2 | 12/2012 | De Camargo | |
| 8,430,649 B2 | 4/2013 | Albers et al. | |
| 8,471,551 B2 | 6/2013 | Lake et al. | |
| 8,651,837 B2 | 2/2014 | Tetzlaff | |
| 9,017,043 B2 * | 4/2015 | Parmeter et al. ....... | E21B 33/14 166/285 |
| 2006/0157240 A1 | 7/2006 | Shaw et al. | |
| 2008/0257548 A1 | 10/2008 | Shaw et al. | |
| 2011/0014071 A1 | 1/2011 | Du et al. | |
| 2013/0272898 A1 | 10/2013 | Toh et al. | |

* cited by examiner

*Primary Examiner* — Gilbert Lee
(74) *Attorney, Agent, or Firm* — Shawn Hunter

(57) ABSTRACT

Seal sections for electric submersible pumps. Seal sections are described which include a combination of a barrier fluid to protect a seal from unfavorable ingress and control of differential pressure across the face of the seal.

19 Claims, 3 Drawing Sheets

ESP MECHANICAL SEAL LUBRICATION

BACKGROUND OF THE INVENTION

1. Field of the Invention

The invention relates generally to electric submersible pump assemblies used for hydrocarbon production recovery. In particular aspects, the invention relates to systems for limiting oil leakage from downhole motors used in electric submersible pump assemblies.

2. Description of the Related Art

A typical electrical submersible pump (ESP) system includes a pump that is driven by a motor. Because the ESP system may be disposed at great depths and are inaccessible at this time, the motors are designed to operate for a long period of time without maintenance. Motor oil is used to help lubricate the motor and to dissipate the heat the motor generates during operation. A seal section is used between the motor and pump to isolate the clean motor oil from the wellbore fluid. This seal section also provides for volume change of the motor oil during operation due to changes in pressure and temperature. By allowing the volume of motor oil to change, the internal motor pressure is equalized with the wellbore annulus pressure. A shaft in the seal section transmits torque from the motor to the pump.

Controlling leakage around rotating shafts is often achieved by utilizing mechanical seals. Some leakage will always occur across the faces of a mechanical seal in operation. By design, a small amount of leakage of clean motor oil through the seal is desired to lubricate the faces of the seal. This can be accomplished by having a greater internal oil pressure than external. If the external fluid pressure is higher, leakage will be driven in the other direction, causing external fluid to contaminate the motor oil through the mechanical seal. Over time, as the seal starts to wear, the leakage rate increases and can become problematic to the operation of the equipment. If the seal is not properly lubricated, the wear will be accelerated. Mechanical seal flush plans of various types are used to keep mechanical seals working properly by maintaining proper operating conditions of the seals in order to maximize run life and control leakage. Employing flush plans is relatively straightforward in applications where the mechanical seals are accessible, but it becomes more difficult with rotating equipment that is installed in remote locations, such as downhole pump applications.

SUMMARY OF THE INVENTION

The present invention provides mechanical arrangements for downhole motors with seal assemblies that promote lubrication of the mechanical seals. The arrangements of the present invention are particularly useful for extending the run life of an ESP.

Exemplary seal sections are described which include a combination of a barrier fluid to protect a seal from unfavorable ingress and control of differential pressure across the face of the seal. The barrier fluid is a heavy specific gravity blocking fluid that is placed on top of a mechanical seal to prevent fluid ingress into the ESP seal section. The barrier fluid can be a relatively heavy specific gravity fluid that does not mix well with water or other substances. In certain embodiments, a barrier fluid pocket or reservoir is recessed inside the head or guides of the seal assembly to facilitate the addition of the barrier fluid. The purpose of the barrier fluid is to displace and block water or well fluid from coming into contact with the rotating face of the mechanical seal to prevent water or well fluid ingress past the seal. The barrier fluid would also allow lighter fluids, such as lubricating fluid (motor oil) to pass upward through the barrier. As a result, motor oil within the seal section can leak out, as desired, while fluid ingress is prevented.

In addition, the invention provides mechanisms that produced positive fluid pressure within the seal section and thereby dictate the preferred direction of leakage across the mechanical seals of the seal section and provide improved or even optimum pressure across the mechanical seal faces. In certain embodiments, the positive fluid pressure mechanisms include a metallic, bellows-based pressure compensator having a natural spring rate of the bellows. The positive fluid pressure mechanism also includes a biasing means that increases fluid pressure of motor oil retained within the bellows assemblies of the seal section.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE PREFERRED EMBODIMENTS

Figure 1:
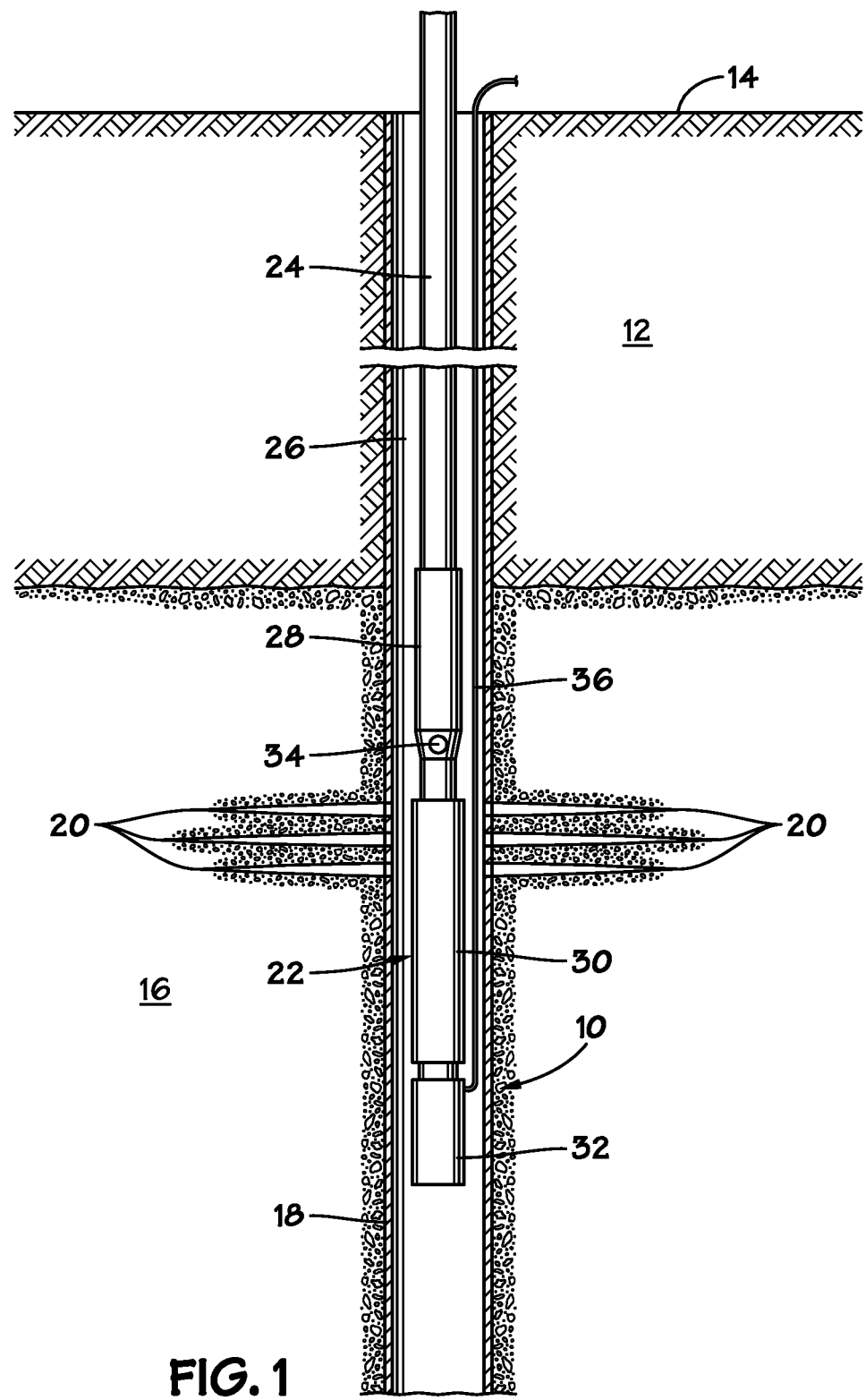
FIG. 1 is a side view of an exemplary electric submersible pump assembly located within a wellbore.

FIG. 1 illustrates an exemplary wellbore 10 that has been drilled through the earth 12 from the surface 14 down to a hydrocarbon-bearing formation 16. The wellbore 10 has been lined with metallic casing 18 of a type known in the art. Perforations 20 are disposed through the casing and into the formation 16, thereby allowing hydrocarbons to enter the wellbore 10.

An electric submersible pump (ESP) assembly, generally indicated at 22, is shown disposed within the wellbore 10 by production tubing 24. An annulus 26 is defined between the casing 18 and the production tubing 24/ESP 22. The ESP assembly 22 includes a pump section 28, a seal section 30 and a motor section 32. As is known, the motor section 32 drives the pump section 28 to draw hydrocarbon fluid in from the wellbore 10 via fluid inlets 34 and flow it to the surface 14. A power cable 36 provides power to the motor section 32 from the surface 14. As is known, the motor section 32 includes an outer housing, a stator and a rotor that is rotatable with respect to the stator. The rotor rotates a shaft that will, in turn, power the pump section 28. It is noted that, while the motor section 32 and seal section 30 are shown in the drawings to be located below the pump section 28, this is not necessarily the case in practice. The pump section 28 might be located below the motor section 32.

Figure 2:
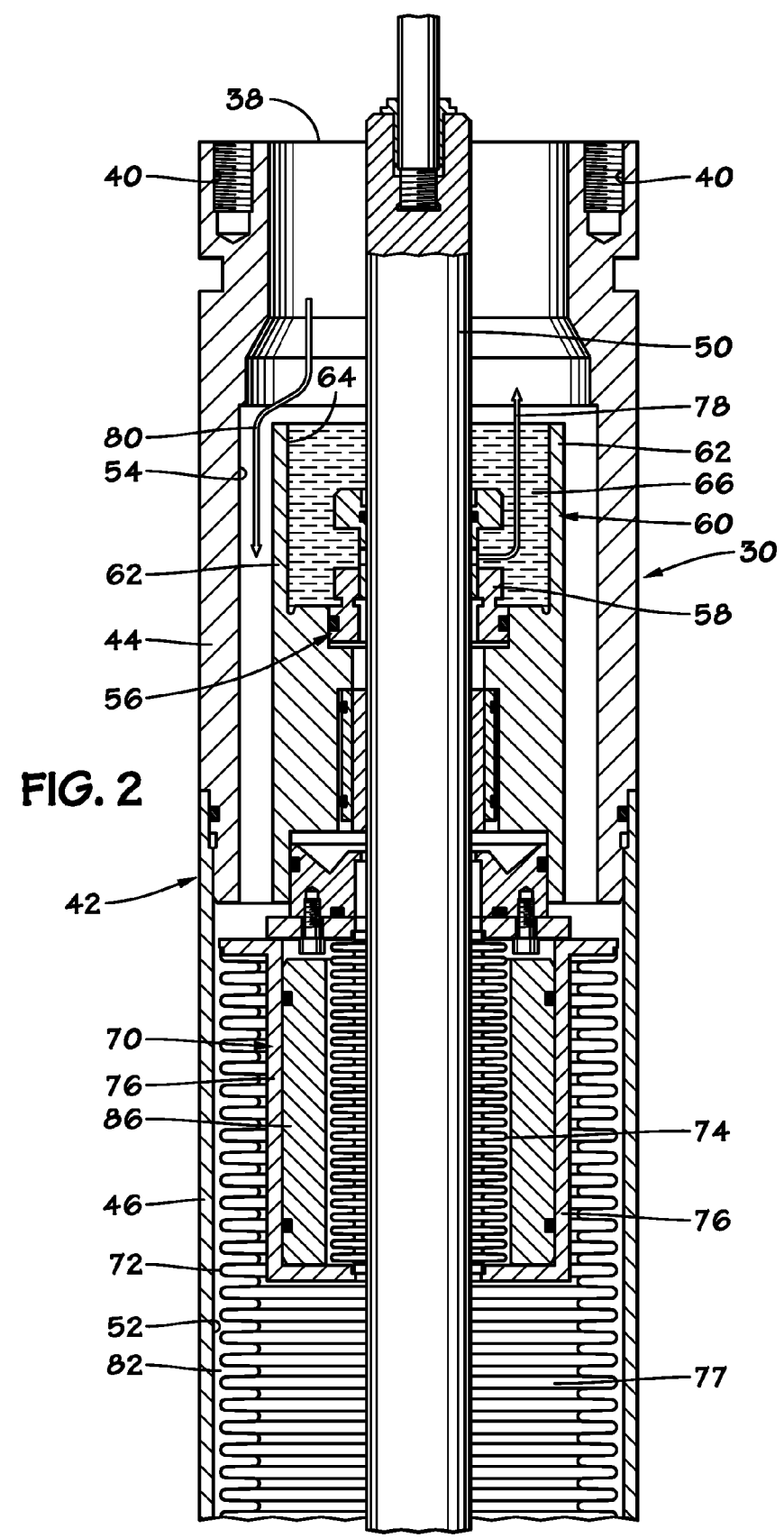
FIG. 2 is a side, cross-sectional view of upper portions of an exemplary seal section which incorporates features in accordance with the present invention.
Figure 3:
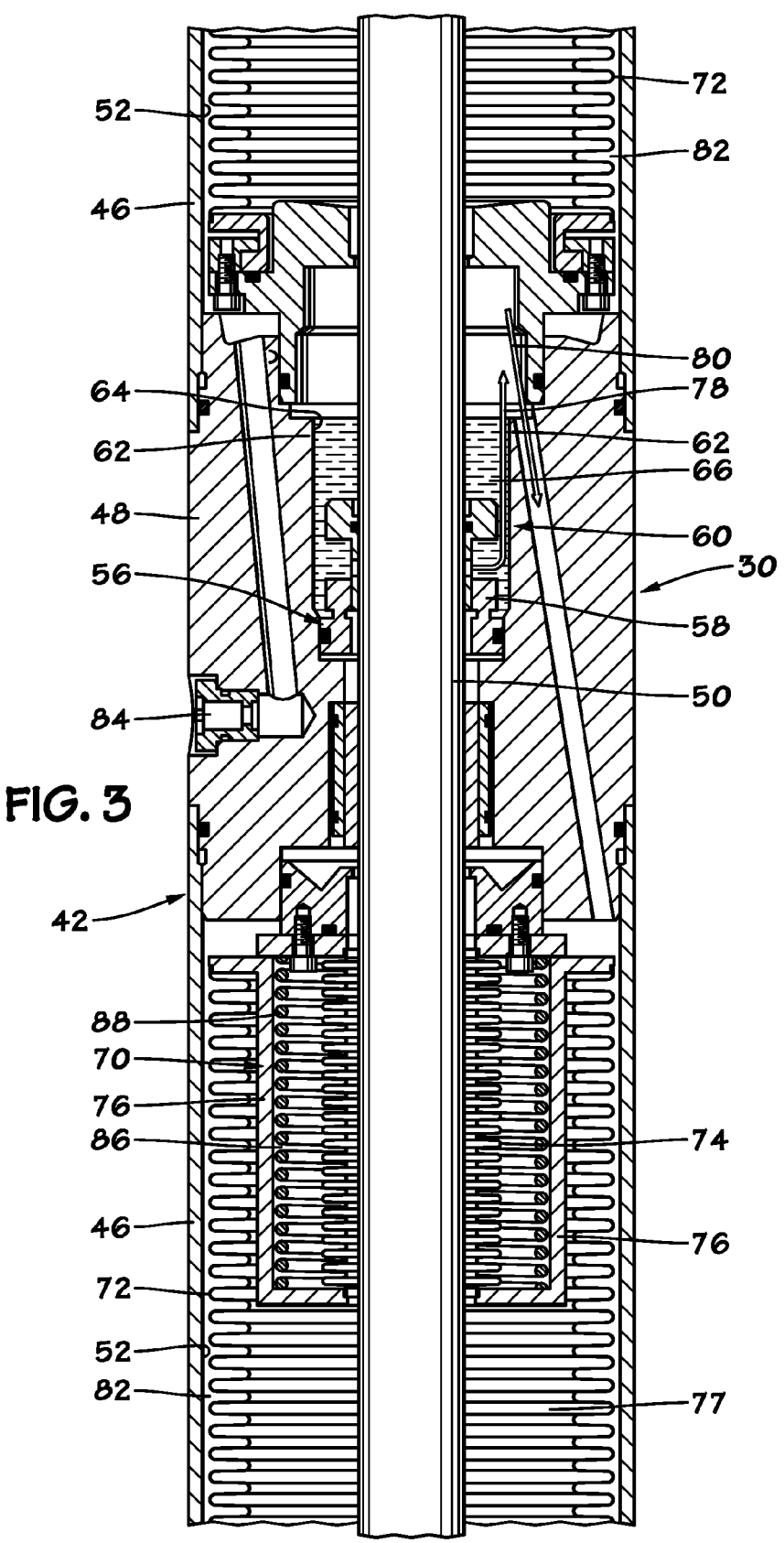
FIG. 3 is a side, cross-sectional view of lower portions of an exemplary seal section which incorporates features in accordance with the present invention.

FIGS. 2 and 3 are cross-sectional views of portions of the interior of the seal section 30. FIG. 2 illustrates the upper axial end 38 of the exemplary seal section 30 having threaded openings 40, which permit the seal section 30 to be affixed to the pump section 28 with suitable connectors (not shown). The outer housing 42 of the seal section 30 is made up of a top cap 44, one or more outer housing sleeves 46, and intermediate guides 48, as are known in the art and which are typically threaded together.

A central shaft 50 passes through the axial center of the housing 42 and, as is known, is used to transmit rotational power from the motor section 32 to the pump section 28. A bellows chamber 52 is defined radially within each housing sleeve 46. A well fluid chamber 54 is defined within the top cap 44. Mechanical seal assemblies, generally indicated at 56, are disposed axially between each of the bellows chambers 52 as well as above the upper most bellows chamber 52 (see FIG. 2). Those of skill in the art will understand that there may be a series of bellows chambers 52 and seal assemblies 56 within the seal section 30, depending upon the needs and desires of the well operators. Mechanical fluid seals 58 of known construction form part of each mechanical seal assembly 56 and surround the shaft 50. A seal guide 60 is formed axially adjacent to and above mechanical seal 58. Portions of the seal assembly 56 reside within the seal guide 60. A barrier fluid reservoir 62 is formed within each guide 60 and presents an open upper end 64. Barrier fluid 66 resides within each reservoir 62. The barrier fluid 66 is a heavy specific gravity blocking fluid that is placed on top of the mechanical seal 58 to prevent well fluids from moving downwardly across the seal 58 and into the bellows chamber 52 below. The barrier fluid 66 can be a relatively heavy specific gravity fluid that does not mix well with water or other substances. In particular embodiments, the barrier fluid 66 has a density that is significantly greater than water. According to further particular embodiments, the barrier fluid 66 has a specific gravity that is from about 1.8 to about 2.2. The purpose of the barrier fluid 66 is to displace and block water or well fluid from coming into contact with the rotating face of the mechanical seal 58 to prevent water or well fluid ingress past the seal assembly 56. The barrier fluid 66 allows lighter fluids, such as lubricating fluid (motor oil) to pass upward through the barrier.

A metallic bellows assembly, generally shown at 70 is located in each bellows chamber 52 and includes a radially outer bellows 72, a radially inner bellows 74 and a sleeve 76 which interconnects the inner and outer bellows 74, 72. Each of the bellows 72, 74 is expandable and contractible axially in the manner of an accordion bellows. Motor oil is retained within a bellows reservoir 77 that is formed by the bellows assembly 70. The natural spring force of the bellows assembly 70 will tend to cause the motor oil to migrate up between the seals 58 and the shaft 50, as illustrated by arrows 78 in FIGS. 2 and 3. The barrier fluid 66 within the reservoir 77 will prevent well fluid from reaching the seals 58, instead redirecting well fluids around the seal guide 60 and to exterior space 82, as indicated by arrows 80 in FIGS. 2 and 3.

During typical operation, well fluid resides within the well fluid chamber 54 as well as the annular spaces 82 which radially surround the outer bellows 72. Well fluid may also enter the seal section 30 via port 84. Motor oil to be supplied to the adjacent motor section 32 is contained within each bellows assembly 70. Motor oil resides within each outer bellows 72 below the sleeve 76 and can be transmitted, under pressure, upwardly between the inner bellows 74 and the shaft 50.

Also in accordance with particular embodiments of the present invention, biasing mechanisms are provided that produce positive fluid pressure within the seal section 30 and thereby dictate the preferred direction of leakage across the mechanical seals 58 of the seal section 30 and provide improved or even optimum pressure across the mechanical seal faces. FIG. 2 depicts a biasing mechanism in the form of a weighted member 86 which is disposed within the outer housing 42 in order to exert pressure upon the motor oil within the bellows assembly 70. Provided the assembly is in the vertical position, the pressure applied will be proportional to the weight of the weighted member 86. The pressure applied will largely not depend on the position of the bellows assembly 70 within the outer housing 42. The weighted member 86 is preferably cylindrical and resides atop the sleeve 76 radially outside of the inner bellows 74. In the depicted embodiment, O-ring seals 87 are compressed against sleeve 76 and help to hold the weighted member 86 in place as well as protect the bellows assembly 70 from potential damage from the weighted member 86 resulting from vibration. FIG. 3 illustrates an alternative biasing mechanism for the bellows assembly 70 in the form of a compression spring 88 which urges the sleeve 76 axially downwardly. The compression spring 88 is shown compressed in FIG. 3. In this embodiment, the pressure applied to the motor oil within the bellows assembly 70 will be dependent upon the spring rate of the spring and the position of the bellows assembly 70 within the outer housing 42. This pressure will be substantially unaffected by an orientation other than vertical in the wellbore 10.

Those of skill in the art will recognize that numerous modifications and changes may be made to the exemplary designs and embodiments described herein and that the invention is limited only by the claims that follow and any equivalents thereof.

What is claimed is:

1. A seal section for an electric submersible pump having a pump section and a motor section which powers the pump section, the seal section comprising:
   an outer housing enclosing a bellows assembly which retains a volume of motor oil;
   a shaft disposed axially through the outer housing and rotatable within the housing, the shaft transmitting rotational power from the motor section to the pump section;
   a seal radially surrounding the shaft to retain the motor oil within the bellows assembly; and
   a barrier fluid reservoir proximate the seal and retaining a barrier fluid that permits motor oil within the bellows assembly to pass the seal but blocks external fluids from passing the seal, the barrier fluid having a density greater than water density.

2. The seal section of claim 1 further comprising a biasing mechanism for the bellows assembly to produce positive pressure upon the motor oil retained within the bellows assembly and promote outward leakage of motor oil across the seal.

3. The seal section of claim 2 wherein the biasing mechanism comprises a weighted member.

4. The seal section of claim 3 wherein:
   the bellows assembly further comprises a radially inner bellows, a radially outer bellows and sleeve that interconnects the inner and outer bellows; and
   the weighted member is disposed upon the sleeve.

5. The seal section of claim 2 wherein the biasing mechanism comprises a compression spring.

6. The seal section of claim 5 wherein:
   the bellows assembly further comprises a radially inner bellows, a radially outer bellows and sleeve that interconnects the inner and outer bellows; and
   the compression spring biases the sleeve within the outer housing.

7. The seal section of claim 1 wherein the barrier fluid reservoir is located above the seal.

8. The seal section of claim 1 wherein the barrier fluid reservoir presents an open upper end.

9. The seal section of claim 1 wherein the barrier fluid reservoir is located above the seal.

10. The seal section of claim 1 wherein the barrier fluid reservoir presents an open upper end.

11. A seal section for an electric submersible pump having a pump section and a motor section which powers the pump section, the seal section comprising:
- an outer housing enclosing a bellows assembly which retains a volume of motor oil, the bellows assembly further having a radially inner bellows, a radially outer bellows and sleeve that interconnects the inner and outer bellows;
- a shaft disposed axially through the outer housing and rotatable within the housing, the shaft transmitting rotational power from the motor section to the pump section;
- a seal radially surrounding the shaft to retain the motor oil within the bellows assembly;
- a biasing mechanism for the bellows assembly to produce positive pressure upon the motor oil retained within the bellows assembly and promote outward leakage of motor oil across the seal; and
- a barrier fluid reservoir proximate the seal and retaining a barrier fluid having a density greater than water density and that permits motor oil within the bellows assembly to pass the seal but blocks external fluids from passing the seal.

12. The seal section of claim 11 wherein the biasing mechanism comprises a weighted member.

13. The seal section of claim 12 wherein:
the bellows assembly further comprises a radially inner bellows, a radially outer bellows and sleeve that interconnects the inner and outer bellows; and
the weighted member is disposed upon the sleeve.

14. The seal section of claim 11 wherein the biasing mechanism comprises a compression spring.

15. The seal section of claim 14 wherein:
the compression spring biases the sleeve within the outer housing.

16. A seal section for an electric submersible pump having a pump section and a motor section which powers the pump section, the seal section comprising:
- an outer housing enclosing a bellows assembly which retains a volume of motor oil;
- a shaft disposed axially through the outer housing and rotatable within the housing, the shaft transmitting rotational power from the motor section to the pump section;
- a seal radially surrounding the shaft to retain the motor oil within the bellows assembly;
- a barrier fluid reservoir proximate the seal and retaining a barrier fluid that permits motor oil within the bellows assembly to pass the seal but blocks external fluids from passing the seal, the barrier fluid having a density greater than water density; and
- a biasing mechanism for the bellows assembly to produce positive pressure upon the motor oil retained within the bellows assembly and promote outward leakage of motor oil across the seal.

17. The seal section of claim 16 wherein the biasing mechanism comprises a weighted member.

18. The seal section of claim 17 wherein:
the bellows assembly further comprises a radially inner bellows, a radially outer bellows and sleeve that interconnects the inner and outer bellows; and
the weighted member is disposed upon the sleeve.

19. The seal section of claim 16 wherein the biasing mechanism comprises a compression spring.

* * * * *